Patented Jan. 6, 1925.

1,522,257

UNITED STATES PATENT OFFICE.

KURT HEINRICH MEYER, OF MANNHEIM, AND JOHANNES MÜLLER, OF EPPSTEIN, NEAR FRANKENTHAL, GERMANY, ASSIGNORS TO BADISCHE ANILIN- & SODA-FABRIK, OF LUDWIGSHAFEN-ON-THE-RHINE, GERMANY, A CORPORATION OF GERMANY.

PRODUCTION OF FORMIC ACID.

No Drawing. Application filed August 17, 1923. Serial No. 657,951.

*To all whom it may concern:*

Be it known that we, KURT HEINRICH MEYER and JOHANNES MÜLLER, citizens of the German Empire, residing at Mannheim and Eppstein, near Frankenthal, respectively, Germany, have invented new and useful Improvements in the Production of Formic Acid, of which the following is a specification.

This invention relates to the production of formic acid from ammonium formate. As is known, in the decomposition of formates by sulfuric acid heat is generated which must be checked in order to avoid decomposition of the formic acid.

We have found that formic acid can be produced in an excellent manner from ammonium formate by decomposing with sulfuric acid, by causing the latter to act on the ammonium formate in the presence of formamide. The formamide acts as a diluent enabling the acid to distribute uniformly in the reaction mixture thus avoiding local superheating and decomposition. The formamide can also simultaneously be converted into formic acid and ammonium sulfate, for which reaction the presence of one molecular proportion of water for each one molecular proportion of formamide is necessary, but an increased amount of water may be employed when the formic acid need not be free from water but simply highly concentrated. The water may be added either to the mixture of ammonium formate and formamide or to the acid used for the conversion or to both.

The ammonium formate may either be dissolved in formamide or so much formamide is only employed as will form a thin or stiff paste with the formate and in order to produce such mixtures, ammonium formate may be heated to say, between 200 and 230 degrees centigrade, until the desired degree of dehydration is obtained. Or the mixture may be directly produced by causing carbon monoxid to react with ammonia and water under pressure; by finally removing the water a mixture of ammonium formate and formamide with more or less free formic acid is obtained.

The invention is more fully explained by the following examples to which however the invention is not limited. The parts are by weight.

*Example 1.*

630 parts of powdered ammonium formate and 120 parts of formamide are stirred together to form a paste and to the mixture are then gradually added, while stirring, 645.5 parts of sulfuric acid of 96 per cent and 22 parts of water. When the acid has run in, the temperature is raised and the formic acid distilled off. The last fraction thereof is best distilled in vacuo. The output amounts to more than 90 per cent of the theoretical quantity of formic acid.

*Example 2.*

658 parts of ammonium formate, 100 parts of formamide and 14 parts of water are stirred to form a paste and 646.5 parts of sulfuric acid of 96 per cent are then slowly run in, while stirring and cooling, if required. The temperature is then raised and the formic acid distilled off. The yield surpasses 90 per cent of the theoretically calculated yield.

We claim:

1. The process of manufacturing formic acid which consists in decomposing a mixture of ammonium formate and formamide with sulfuric acid.

2. The process of manufacturing formic acid which consists in decomposing a mixture of ammonium formate and formamide with sulfuric acid in the presence of water.

3. The process of manufacturing formic acid which consists in decomposing a mixture of ammonium formate and formamide with sulfuric acid in the presence of at least one molecular proportion of water to each one molecular proportion of formamide.

4. The process of manufacturing formic acid which consists in heating ammonium formate to convert it into a mixture of ammonium formate and formamide and decomposing the mixture with sulfuric acid in the presence of at least one molecular proportion of water to each one molecular proportion of formamide.

5. The process of manufacturing formic acid which consists in causing carbon monoxid to react with ammonia in the presence of water and under pressure, evaporating the solution and decomposing the remaining mixture with sulfuric acid and in the presence of at least one molecular proportion of water to each one molecular proportion of formamide.

In testimony whereof we have hereunto set our hands.

KURT HEINRICH MEYER.
JOHANNES MÜLLER.